United States Patent
Hammock et al.

(10) Patent No.: US 11,257,125 B2
(45) Date of Patent: Feb. 22, 2022

(54) SYSTEM AND METHOD FOR PROVIDING ADVERTISER AUCTIONS BASED ON SEGMENTATION INFORMED BY PURCHASE DATA

(71) Applicant: Capital One Financial Corporation, McLean, VA (US)

(72) Inventors: Luke A. Hammock, Washington, DC (US); Janusz Michael Niczyporuk, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 1240 days.

(21) Appl. No.: 14/076,410

(22) Filed: Nov. 11, 2013

(65) Prior Publication Data
US 2014/0164145 A1 Jun. 12, 2014

Related U.S. Application Data

(60) Provisional application No. 61/735,167, filed on Dec. 10, 2012.

(51) Int. Cl.
*G06Q 30/02* (2012.01)
(52) U.S. Cl.
CPC ................. *G06Q 30/0275* (2013.01)
(58) Field of Classification Search
CPC ..................... G06Q 30/027–30/0277
USPC .................................. 705/14, 319
See application file for complete search history.

(56) References Cited

U.S. PATENT DOCUMENTS

| | | | | |
|---|---|---|---|---|
| 8,571,930 | B1* | 10/2013 | Galperin | G06Q 30/0273 705/14.43 |
| 2008/0046316 | A1* | 2/2008 | Shah | G06Q 30/02 705/14.43 |
| 2009/0307072 | A1* | 12/2009 | Morales-Lema | G06Q 40/02 705/14.17 |
| 2010/0036922 | A1* | 2/2010 | Stafford | G06Q 10/107 709/206 |
| 2010/0042421 | A1* | 2/2010 | Bai | G06Q 30/0275 705/14.71 |
| 2010/0324989 | A1* | 12/2010 | Etchegoyen | G06Q 30/0246 705/14.45 |
| 2011/0191201 | A1* | 8/2011 | Jin | G06Q 10/087 705/26.1 |
| 2013/0262226 | A1* | 10/2013 | LaChapelle | G06Q 30/0269 705/14.53 |

* cited by examiner

*Primary Examiner* — Waseem Ashraf
*Assistant Examiner* — Richard G Reinhardt
(74) *Attorney, Agent, or Firm* — Troutman Pepper Hamilton Sanders LLP; Christopher J. Forstner; John A. Morrissett

(57) ABSTRACT

A system and method in accordance with exemplary embodiments may include advertiser auctions based on segmentation informed by purchase data, including a financial institution, one or more advertisers, and a bidding server to facilitate advertiser bidding. Additionally, a system and method in accordance with exemplary embodiments may pool customer and/or transaction information in one or more databases. The system and method in accordance with exemplary embodiments may also utilize a bidding server to permit advertisers to bid on access to information or the ability to present an advertisement and/or offer to a customer.

30 Claims, 4 Drawing Sheets

SYSTEM AND METHOD FOR PROVIDING ADVERTISER AUCTIONS BASED ON SEGMENTATION INFORMED BY PURCHASE DATA

CROSS-REFERENCE TO RELATED APPLICATIONS

This application claims priority to U.S. Provisional Patent Application No. 61/735,167, filed on Dec. 10, 2012, the entire contents of which is incorporated by reference in its entirety.

FIELD OF THE DISCLOSURE

The present disclosure relates to systems and methods for providing advertiser auctions based on segmentation informed by purchase data.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

SUMMARY OF THE DISCLOSURE

Figure 1:
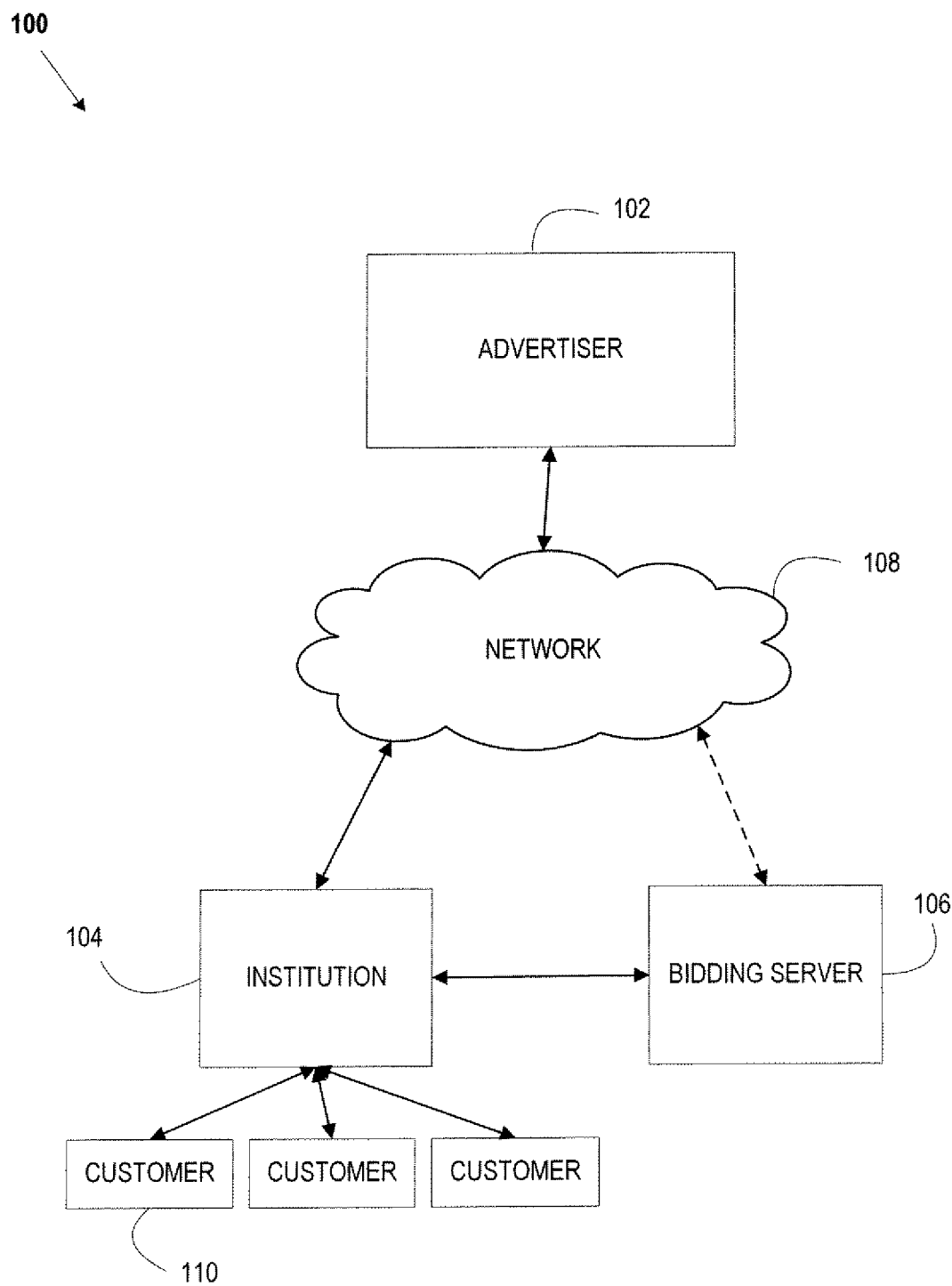
FIG. 1 depicts an exemplary embodiment of a system implementing advertiser auctions based on segmentation informed by purchase data.

Various example embodiments include a system including a database that stores financial information about one or more customers of a financial institution, a communication module that receives a request to target the one or more customers of the financial institution with an advertisement from a requester, a bidding server that receives one or more bids from one or more bidders and determines one or more successful bidders, and one or more computer processors configured to provide the advertisement to the one or more customers of a financial institution as determined by the bidding server.

Various example embodiments also include a method including the steps of storing, in a database, financial information about one or more customers of a financial institution, receiving, via a network, a request to target the one or more customers of the financial institution with an advertisement from a requester, receiving, via a network, one or more bids from one or more bidders, determining, using one or more computer processors, one or more successful bidders, and providing, via a network using one or more computer processors, the advertisement to the one or more customers of a financial institution as determined by the bidding server.

Various example embodiments also include a non-transitory computer-readable storage medium with an executable program stored thereon. The program instructs a microprocessor to perform the following steps store, in a database, financial information about one or more customers of a financial institution, receive, via a network, a request to target the one or more customers of the financial institution with an advertisement from a requester, receive, via a network, one or more bids from one or more bidders, determine, using one or more computer processors, one or more successful bidders, and provide, via a network using one or more computer processors, the advertisement to the one or more customers of a financial institution as determined by the bidding server.

DETAILED DESCRIPTION OF THE DISCLOSURE

The following description is intended to convey a thorough understanding of the embodiments described by providing a number of specific exemplary embodiments and details involving systems and methods for providing advertiser auctions based on segmentation informed by purchase data. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs. A financial institution and system supporting a financial institution are used as examples for the disclosure. The disclosure is not intended to be limited to financial institutions only.

According to the various embodiments of the present disclosure, systems and methods enable advertiser auctions based on segmentation informed by purchase data. Advertiser auctions based on segmentation informed by purchase data as shown and described herein may allow advertisers to target bank customers with advertisements, such as, e.g., card-linked offers, online web-based advertisements, mobile advertisements, or other like advertisements. Advertiser auctions based on segmentation informed by purchase data as shown and described herein also may allow advertisers to have the visibility into the information that financial institutions and/or banks may have about customers that otherwise may be difficult to obtain. Accordingly, advertiser auctions based on segmentation informed by purchase data as shown and described herein may present advertisers a level of transparency to enable, for example, card-linked offers, bank-delivered advertisements, and other like advertisements.

In the various embodiments, advertisers may access a bank-delivered advertisement account and identify how to target customers. For example, advertisers may target customers based on the amount spent by bank customers per month, the types of merchants where bank customers shop, the locations where bank customers shop, the amount bank customers travel. Once advertisers identify how to target customers, advertisers may allow advertisers to "bid" on certain bank customers based on, for example, standardized metrics. Such standardized metrics can include, for example, the cost per offer delivered, cost per advertisement delivered (e.g., television, online, and/or mobile advertisements), cost per cookie dropped, and the like. These standardized metrics may allow advertisers to have complete visibility into what the advertiser receives for the amount spent on advertisements.

In various embodiments, multiple advertisers may bid on various customer groups such that the most desired groups may be the most expensive and the least desired groups may be the least expensive. Once an advertiser wins the bid, and therefore wins the ability to advertise to bank customers, a bank advertiser may present the selected advertisement to its customers and, for example, track success rates. Bank advertisers may use these success rates to develop, for example, impact scores that could be used to inform future advertiser bidding decisions.

Bank advertisers or financial institution advertisers may be, for example, financial institutions that offer advertising services to one or more advertisers. The various systems and methods disclosed herein may utilize purchase data instead of/prioritized over other data, thereby allowing additional granularity to assess the value of a customer or party and enabling financial institutions to operate as, for example, bank advertisers.

Financial institutions may be privy to a large amount of customer data. For example, a financial institution may possess information regarding a customer's name, address, social security number, income information, transaction information, demographic information, or any other information. A financial institution also may possess purchase and/or transaction data relating to its customers. For example and not by way of limitation, purchase and/or transaction data may include information that describes the purchase of a good or service and are associated with a payment account, including credit cards, debit cards, prepaid cards, stored value accounts, gift cards, and accounts that have underlying links to any of the aforementioned accounts. Also, the data elements that comprise purchase data may optionally include: the date/time of the purchase, the merchant selling the product, the location of the purchase (e.g., physical or digital location), the products purchased, descriptions of the products purchased, quantities purchased, the amount of taxes paid for the purchase, the amount of discount redeemed during the purchase, the shipping address/billing address of the purchase, the name of the purchaser, the currency used, the shopping 'lane' or 'terminal' used to make the purchase, and/or any other information relevant to a purchase or transaction.

Purchase data also may include, for example and without limitation, data about items purchased during a purchase transaction, the location of a purchase transaction, the method(s) of payment used during the purchase transaction, and/or any other data about purchase of goods or services at or with one or more merchants and/or service providers. Data about items purchased may include, for example, stock keeping unit (SKU) level data and related SKU data attributes that allow a merchant to uniquely identify goods or services. Data about the location of a purchase transaction may include geocoded data about the merchant associated with the purchase transaction. Where the purchase transaction is an online transaction, data about the location of a purchase transaction may include Internet Protocol (IP) address information, Domain Name System (DNS) information and/or other like information that enables identification of the online merchant or location of the purchase. Data about the payment method(s) used may include any information about the type of card used, including, for example, rewards programs associated with the card used and/or any other information to describe the payment method(s) used during a purchase transaction.

As referred to herein, a purchase or purchase transaction, may be any financial transaction where an item, good, or service is exchanged for money or a monetary equivalent. A purchase may, for example, result in a decrease in a value associated with a purchaser and an increase in a value or benefit to the merchant, seller, or service provider.

From this purchase data or like information, a financial institution may derive many other factors, including for example but not by way of limitation, the potential value of a customer to an advertiser, a demographic segment of a customer, or any other relevant information. The financial institution or bank advertiser may also have the ability to measure the impact of advertisements delivered to customers. Also, the financial institution or bank advertiser may pool customer data and allow bidding to one or more advertisers and allow advertisers to bid on the right to present an advertisement to a customer. By example and not by way of limitation, the institution may utilize one or more databases to store pooled customer data. Additionally, one or more advertisers may receive access to the data pool for informational or analysis purposes.

In an exemplary embodiment, an institution may provide an account to one or more other parties, who may be advertisers. An advertiser may be an entity desiring to advertise to its customers using the advertising services of, for example, a financial institution or bank advertiser. An advertiser may utilize the account with the financial institution or bank advertiser to select targeting strategies for one or more messages to a customer, which may optionally be based on purchase data. A targeting strategy may be any factor for allowing targeting of a customer, for example and not by way of limitation, the spending amount of a customer, the type of purchases made by a customer, locations where a customer utilizes an account, the amount that a customer travels, or any other targeting strategy capable of being derived from financial institution, bank, and/or purchase data.

An advertiser may identify one or more customers through the targeting strategy. Upon identification, an advertiser may bid on one or more customers based on a number of factors, which may include a standardized metric. For example and not by way of limitation, the standardized metric may be cost per offer delivered, cost per advertisement delivered, cost per cookie dropped, cost per redemption, cost per advertisement redeemed, cost per repeat customer created, number of new customers attracted (e.g. an institution may show temporal or other relation between message delivery and a purchase, redemption, or other action, or any other viable metric serving to provide measurement of distribution or redemption of an advertisement. Additionally, the financial institution or advertiser may delineate a plurality of customer groups. An advertiser may bid on a customer group such that the most desirable groups are more expensive and the least desirable groups are less expensive.

In an exemplary embodiment, the financial institution or bank advertiser may present selected customers with selected advertisements. For example and not by way of limitation, an advertisement may be a text, photo, or image section on a bank statement or web site, a display on a mobile device, affiliate and/or partner website, ATM screen, radio station, television advert, or any communication to a customer and/or personalization of customer experience in order to provide discounts, promote product features, alter customer buying behavior, request feedback on products, solicit referral activity, signing up customers for loyalty programs, or any other relevant action. The financial institution or bank advertiser may utilize cookies, application programming interfaces (APIs), or other like software mechanisms to present the selected advertisements to customers via the Internet, television, a mobile device, or other like electronic device. The financial institution or bank advertiser may store the various advertisements for selection in, for example, an advertisement database.

Also, the financial institution or bank advertiser may record success rates of the advertisements. The financial institution or bank advertiser may provide analytics to an advertiser. The analytics may include, for example, customer information, success rates, total advertisements presented, timing and context of each of advertisement, or per card swipe, incremental sale, segmented data (e.g. existing versus new customers, new customers ever vs. new in that quarter, etc.) and/or any distribution or outcome metrics. For example and not by way of limitation, a customer, consumer, business, advertiser, and/or institution may request analytics alone, analytics regarding the results of their advertisements or messages, or otherwise request analytics. Also, a bidding process may optionally be performed with regard to analytic data alone or in addition to other advertisements, messages, etc.

The financial institution or bank advertiser may implement security protocols and safeguards to protect user information. For example and not by way of limitation, information which would permit a customer, consumer, business, and/or institution to be identified may be anonymized to protect a customer, consumer, business, and/or institution's privacy. Also, the institution my implement encryption, authentication, firewalls, and any other available security protocol.

In an exemplary embodiment, a financial institution may collect customer information and divide the customers into a number of segments. The financial institution may then solicit bids for a customer segment from one or more advertisers, those bids optionally reflecting a monetary amount that an advertiser is willing to pay and/or would have to pay in order to present an advertisement to a customer segment. Exemplary customer segments may include, without limitation, customers segmented by credit score bands, customers having certain amounts of reward points, customers who spend particular amounts per month on travel-related expenses, customers who have certain interest rates, customers who spend particular amounts per month on groceries, or any other like segments that can be informed by purchase data. For example, financial institution or bank advertiser may then solicit bids for an advertisement to customers who spend at least $1,000 per month on travel-related expenses. The financial institution or bank advertiser may receive the bids from advertisers via an online advertisement auction similar to the one described herein, whereby, for example, one advertiser bids 5 cents per advertisement to each of the customers within the segment and another advertisement bids 7 cents per advertisement to each of the customers within the segment. The financial institution may select the winning bidder and present an advertisement to one or more customer segment according to the winning bid.

FIG. 1 depicts an exemplary system 100 for providing advertiser auctions based on segmentation informed by purchase data. System 100 may include one or more advertisers 102, a financial institution 104, a bidding server 106, a network 108, and one or more customers 110.

One or more advertisers 102 may be in communication with the system. The one or more advertisers 102 may be, for example and not by way of limitation, a retailer, company, service provider, or any other advertiser.

A financial institution 104 may operate as a financial institution or bank advertiser as described herein. For example, a financial institution 104 may collect and maintain data pertaining to one or more customers 110. The financial institution 104 may also maintain a bidding server 106. The one or more advertisers may communicate with the bidding server 106 via, for example, network 108, in order to place bids pertaining to one or more customers 110 or groups comprising one or more customers 110. Financial institution 104 may utilize cookies, application programming interfaces (APIs), or other like software mechanisms to receive bids and present the selected advertisements to customers via the Internet, television, a mobile device, or other like electronic device. The information may include, but is not limited to, name, address, social security number, income information, transaction information, demographic information, or any other information.

Network 108 may enable communication between a financial institution 104, one or more advertisers 102, and a bidding server 106. For example, Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the exemplary types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

Figure 2:
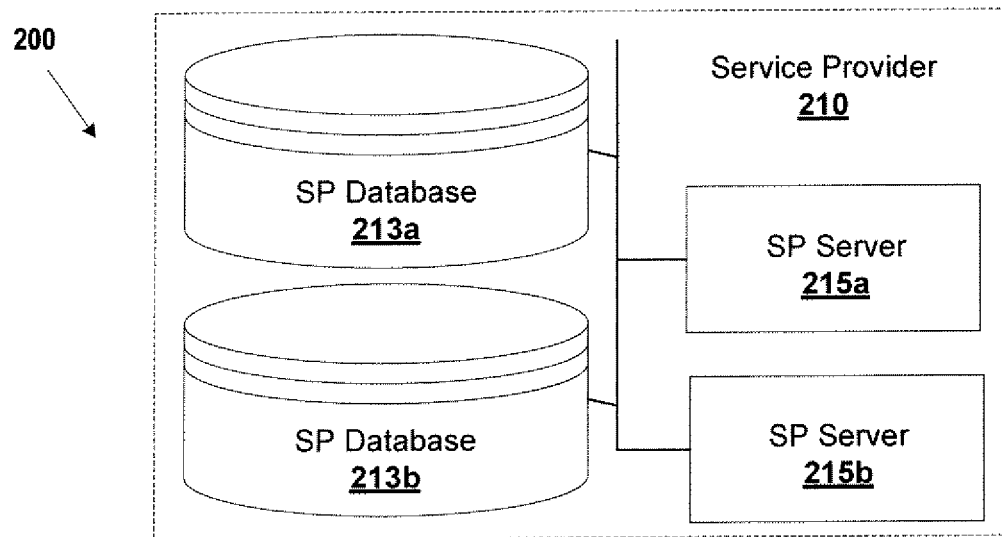
FIG. 2 depicts an example embodiment of a service provider system.

FIG. 2 is a diagram illustrating an example system 200 that may be used by a service provider 210. As described herein, the example system 200 may be used by, for example, financial institution or bank advertisers, advertisers, and/or as bidding service providers. The exemplary system 200 may comprise an advertiser 102 system, a financial institution 104 system, and/or a bidding server 106. As shown in FIG. 2, an example system 200 may include or more service provider (SP) servers 215 (e.g., SP server 215a, SP server 215b) and one or more SP databases 213 (e.g., database 213a, and database 213b), which may be owned, operated, and/or managed by, for example a service provider such as, for example an advertiser, a financial institution or bank advertiser or bidding service provider.

SP servers 215a, 215b can be physical computers, or computer systems, configured to run one or more services to support users of other computers on one or more networks and/or computer programs executing on physical computers, or computer systems, and configured to serve the requests of other programs that may be operating on one or more servers (not shown) or on other computing devices, such as customer computing devices 110. SP servers 215a, 215b can include, by way of example and not limitation, communication servers, database servers, fax servers, file servers, mail servers, print servers, name servers, web servers, proxy servers, gaming servers, etc. In some aspects, SP servers 215a, 215b may be configured to transmit and/or receive information to and/or from client computing devices 110, other servers (e.g., SP servers associated with, for example, financial institution or bank advertisers, advertisers and bidding service providers, Internet Service Provider (ISP) servers (not shown), etc.), and/or databases (not shown) directly and/or indirectly via any combination of wired and/or wireless communication systems, method, and/or devices, including, for example, network 108. SP servers 215a, 215b may include one or more physical servers, or server systems, and/or one or more proxy servers, each configured to run one or more services to support other computers or computer systems, such as, for example, client computer systems (not shown). In certain embodiments, the same server devices may perform the roles of physical SP servers 215a, 215b and/or proxy SP servers 215a, 215b.

One or more SP Databases 213a, 213b can be one or more computing devices configured to store databases, e.g., organized collections of data and their data structures, and/or execute database management systems, e.g., computer programs configured to control the creation, maintenance, and use of the database. Collectively, databases and their database management systems can be referred to as database systems. As used herein, a database can refer to databases, database management systems, and/or database systems. In some aspects, database can be configured to store databases, while database management systems are stored and executed on one or more remote computing devices, such as computing devices 110, and/or one or more remote servers, such as SP servers 215a, 215b. Databases 213a, 213b can include software database programs configured to store data associated with SP servers 215a, 215b and their associated applications or processes, such as, for example, standard databases or relational databases. Databases 213a, 213b can include relationship database management systems (RDBMS) that may be configured to run as a server on SP servers 215a, 215b. Databases 213a, 213b can be configured to transmit and/or receive information to and/or from client computing devices 110, SP servers 215a, 215b, and/or other databases directly and/or indirectly via any combination of wired and/or wireless communication systems, method, and/or devices, including, for example, network 108.

In the embodiment of FIG. 1, computing devices associated with customer 110 may communicate directly with SP servers via a network using standard Internet Protocols, such as HTTP, transmission control protocol (TCP), internet protocol (IP), etc. For example, HTTP requests from client computing devices 110 may be encapsulated in TCP segments, IP datagrams, and Ethernet frames and transmitted to SP servers, e.g., SP servers associated with financial institution 104. Third parties may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications from client computing devices 110 to SP servers 130.

In one or more exemplary designs of service provider system 200, the functions described can be implemented in hardware, software, firmware, or any combination thereof. If implemented in software, the functions can be stored as one or more instructions or code on computer-readable medium, including the computer-readable medium described above.

Computing devices associated with customer 110 may be any type of electronic device and/or component configured to execute one or more processes, many of which are conventional. Computing devices associated with customer 110 can include, by way of example and not limitation, clients, desktop computers, laptop computers, network computers, workstations, personal digital assistants (PDA), tablet computers and/or electronic readers (e.g., iPad, Kindle Fire, Playbook, Touchpad, etc.), telephony devices, smartphones, wireless base stations, wireless access devices, pagers, music playing devices (e.g., iPod, etc.), routers, hubs, cameras, printers, copiers, scanners, projectors, alarms, lights, home entertainment systems, audio/visual systems, home security devices, intercoms, domestic robots, appliances, HVAC systems, etc., or any component or subcomponent of another computing devices associated with customer 110 or assemblage, such as, for example, a car, a train, a plane, a boat, etc. Although not illustrated, computing devices associated with customer 110 can also include servers and/or databases. Computing devices associated with customer 110 may be configured to transmit and/or receive information to and/or from other client computing devices 110, SP servers, and/or databases directly and/or indirectly via any combination of wired and/or wireless communication systems, method, and devices, including, for example, network 108.

Figure 3:
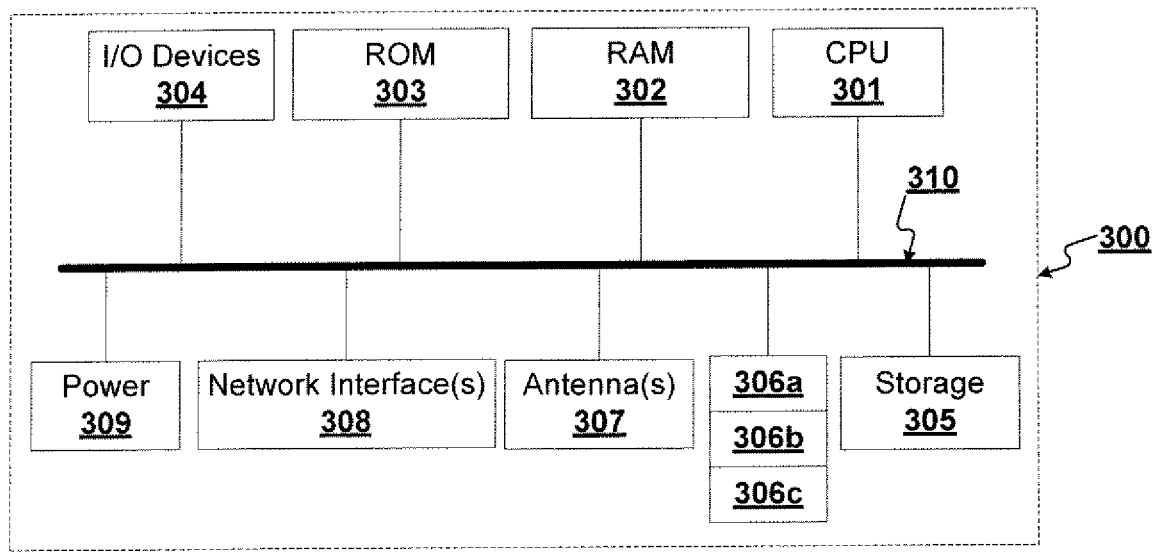
FIG. 3 depicts an example embodiment of a client device associated with a customer.

FIG. 3 is a block diagram of an example computing device associated with customer 110, consistent with the disclosed embodiments. It should be readily apparent that the example client computing device 300 depicted in FIG. 3 represents a generalized schematic illustration and that other components/devices can be added, removed, or modified. In one example embodiment, client computing device 300 can be configured to include address translation and full virtual-memory services.

As shown in FIG. 3, each client computing device 300 can include one or more of the following components: at least one central processing unit (CPU) 301 configured to execute computer program instructions to perform various processes and methods, random access memory (RAM) 302 and read only memory (ROM) 303 configured to access and store data and information and computer program instructions, I/O devices 304 configured to provide input and/or output to client computing device 300 (e.g., keyboard, mouse, display, speakers, printers, modems, network cards, etc.), and storage media 305 or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system 306a, application programs 306b including, for example, web browser application, email application and/or other applications, and data files 306c may be stored.

In addition, each client computing device 300 can include antennas 307, network interfaces 308 that provide wireless and/or wire line digital and/or analog interface to one or more networks, such as network 108, over one or more network connections (not shown), a power source 309 that provides an appropriate alternating current (AC) or direct current (DC) to power one or more components of client computing device 300, and a bus 310 that allows communication among the various disclosed components of client computing device 300. Each of these can be conventional components and will not be discussed further.

Although not shown, each user device and service provided system, for example, can include one or more mechanisms and/or devices by which a user device can communicate with, for example a financial institution or other service provider. For example, user device and service provider systems can include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, etc. These mechanisms and/or devices can include any combination of hardware and/or software components and can be included, in whole or in part, in any of the components shown in FIGS. 2 and 3.

In one or more example designs of computing device 300, the functions described can be implemented in hardware, software, firmware, or any combination thereof. If implemented in software, the functions can be stored as one or more instructions or code on computer-readable medium, including the computer-readable medium described above (e.g., RAM 302, ROM 303, storage media 305, etc.). The components shown and described with respect to FIG. 3 also may be included within service provider system 200 to enable the systems and methods described herein.

Figure 4:
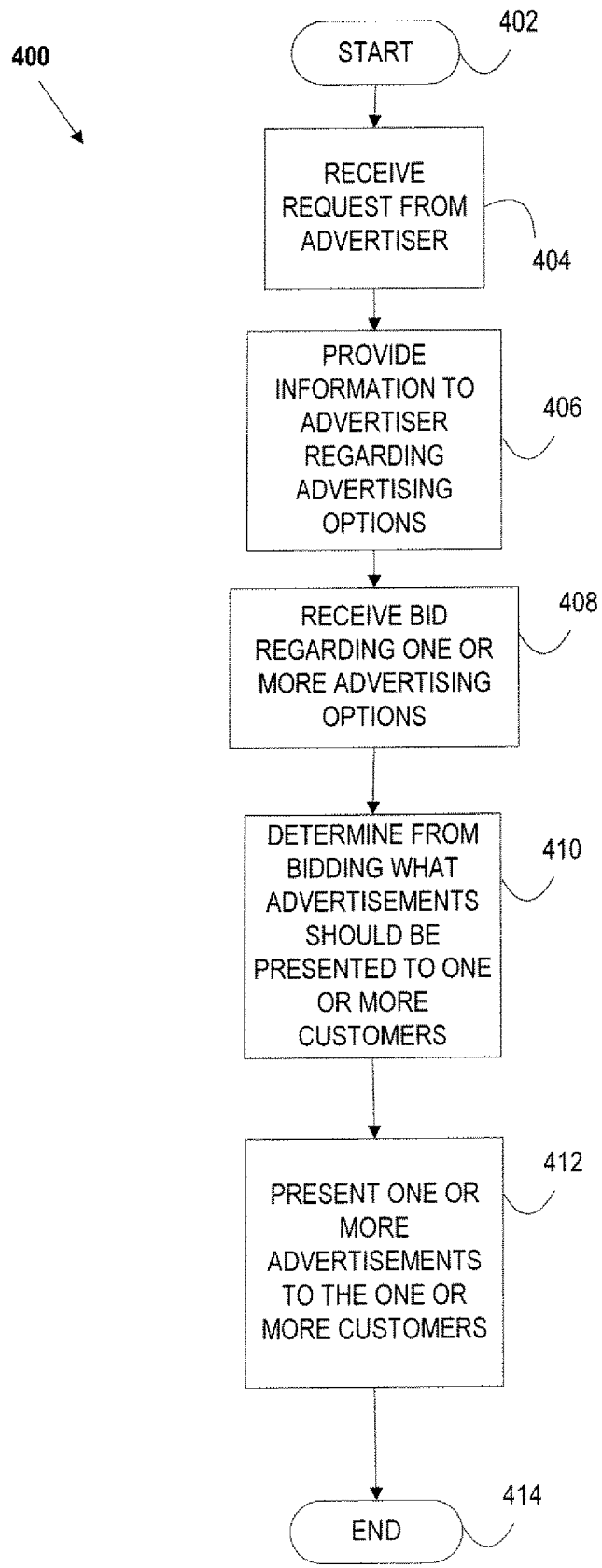
FIG. 4 depicts an exemplary embodiment of a method for providing advertiser auctions based on segmentation informed by purchase data.

FIG. 4 depicts an exemplary method for providing advertiser auctions based on segmentation informed by purchase data. At step 402, the method may start.

At step 404, an institution may receive a request from an advertiser. In various examples, a financial institution 104 (e.g., a financial institution or bank advertiser) may receive a request from an entity (e.g., advertiser 102) desiring to advertise to the customers 110 of financial institution 104. For example and not by way of limitation, a request may include a request to target one or more customers or one or more customer groups or segments with one or more advertisements. In one example, a financial institution may receive a request from an advertiser to target customers of the financial institution who spend more than $1000 per month on travel-related expenses. A financial institution also may receive a request from an advertiser to target customers of the financial institution who have a credit score over 800. Other similar requests to target one or more customers or one or more customer groups or segments with one or more advertisements may be received. In one example, an advertiser may communicate the request and the financial institution or bank advertiser may receive the request via a network such as, network 108.

At step 406, the institution may provide information to an advertiser regarding one or more advertising options. In an example embodiment, an institution may receive an inquiry from an advertiser regarding targeting a customer segment with one or more advertisements. The institution may respond by sending information about the target segment, which may include but is not limited to, the amount of customers in the segment, the average cost of an advertisement for a given segment, an acknowledgement that the segment is available for advertising, or any other relevant information. For example, where an institution receives a request from an advertiser to target customers of the financial institution who spend more than $1000 per month on travel-related expenses, the institution may respond that it has, for example 750 such customers, that the institution is able to initiate an auction for advertisements to that segment, and that the starting bid is 5 cents per customer advertisement. The response also may include other information and may be communicated via a network to the advertiser.

At step 408, the institution may utilize, for example, a bidding server to receive one or more bids from one or more advertisers regarding a customer or segment of customers. For example and not by way of limitation, a bid may represent a monetary amount that an advertiser is prepared to pay in order to have one or more advertisements presented to the customer or segment of customers. The bid may optionally represent a cost per advertisement, a total cost, or any other means of bidding that could be used in such a method. The institution may optionally provide a time or other window in which it will accept advertisement bids. In various embodiments, the bidding server may be operated by the institution. The bidding server also may be operated by a bidding service provider. Where, for example, an auction is ongoing for advertisements to customers of the financial institution who spend more than $1000 per month on travel-related expenses, the institution may receive the initial bid of 5 cents per advertisement and a subsequent bid of, for example, 7 cents per advertisement. This process may go on for a finite period of time as defined by the auction, and/or until a certain bid, for example 20 cents per advertisement, is received. In the various examples, the financial institution and/or the bidding service provider may establish the parameters for the bidding auction.

At step 410, the institution may analyze the one or more bids received to determine what advertisements, if any, the institution might present to one or more customers or segments of customers. For example and not by way of limitation, the institution may determine that the overall high bidder's advertisements should be presented to one or more customers or segments of customers. Also, the institution may take into account other information, such as advertisement preferences, business relationships, overall advertiser monetary contribution, size of advertiser, content of the advertisement, or any other factor which may determine the desirability of a given advertisement.

At step 412, the institution may present the one or more advertisements to one or more customers or segments of customers. For example and not by way of limitation, the institution may place a graphical or textual advertisement on a billing statement or other document for presentation to one or more customers or segments of customers. Also, the institution may place a graphical or textual advertisement on a web page accessed by one or more customers or segments of customers. The institution also may transmit, for example, mobile advertisements to user devices associated with one or more customers. The institution may also provide any other advertisements to one or more customers or segments of customers based on advertiser requests, the bidding process, or any other factor. At step 414, the method may end.

Figure 5:
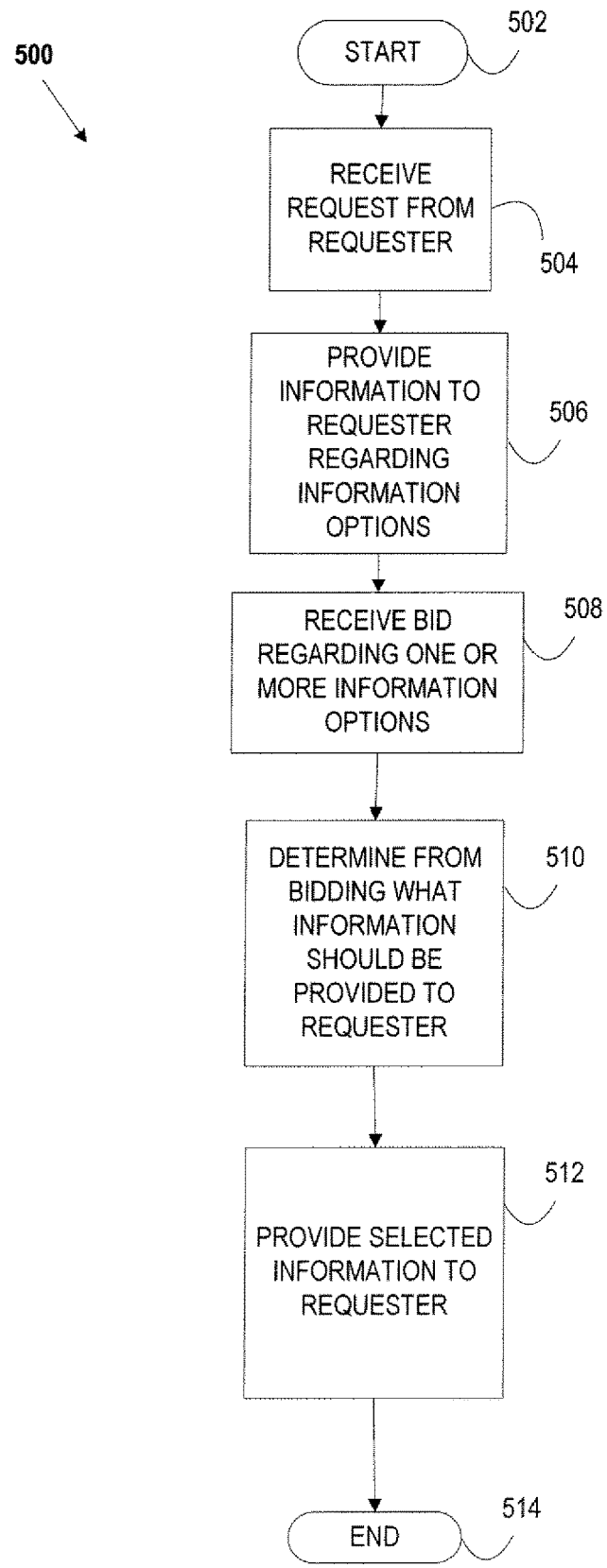
FIG. 5 depicts an exemplary embodiment of a method for providing advertiser auctions based on segmentation informed by purchase data.

FIG. 5 depicts an exemplary method for providing advertiser auctions based on segmentation informed by purchase data. At step 502, the method may start.

At step 504, an institution may receive a request from a requester. For example and not by way of limitation, a request may include a request to obtain information pertaining to one or more customers or segments of customers. At step 506, the institution may provide information to an advertiser regarding one or more information options. In an exemplary embodiment, an institution may receive an inquiry from an requester regarding obtaining customer and/or transaction information relating to a customer segment. The institution may respond by sending information about the target segment, which may include but is not limited to, the amount of customers in the segment, the average cost of information pertaining to a given segment, an acknowledgement that the segment is available for information-gathering purposes, or any other relevant information.

At step 508, the institution may utilize a bidding server to receive one or more bids from one or more institutions regarding one or more customers or segment of customers. For example and not by way of limitation, a bid may represent a monetary amount that a requester is prepared to pay in order to obtain information pertaining to a customer or segment of customers. The bid may optionally represent a cost of information per customer, a total cost, or any other means of bidding that could be used in such a method. The institution may optionally provide a time or other window in which it will accept information bids.

At step 510, the institution may analyze the one or more bids received to determine what information, if any, the institution might provide to one or more requesters. For example and not by way of limitation, the institution may determine that the overall high bidder may obtain customer and/or transaction information pertaining to one or more customers or segments of customers. Also, the institution may take into account other information, such as security practices, business relationships, overall requester monetary contribution, size of requester, content of the information requested, the requester's desired use of the information, or any other factor which may determine the desirability of a given information request.

At step 512, the institution may present the one or more advertisements to one or more customers or segments of customers. For example and not by way of limitation, the institution may place a graphical or textual advertisement on a billing statement or other document for presentation to one or more customers or segments of customers. Also, the institution may use one or more computer processors to place a graphical, audio, video, or textual advertisement on a web page accessed by one or more customers or segments of customers. The institution may also provide any other advertisements to one or more customers or segments of customers based on advertiser requests, the bidding process, or any other factor. At step 314, the method may end.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A system, comprising:
a centralized database at a system of a financial institution that stores pooled financial information about multiple customers of the financial institution, including stock keeping unit (SKU) level data and geocoded data, wherein the centralized database is available for access to both the financial institution and multiple requestors;
a communication processor that receives a request to access the centralized database to target the multiple customers of the financial institution with an advertisement from the multiple requesters via a network based on the pooled financial information, that securely facilitates simultaneous communication and access to the pooled financial information about the multiple customers to the multiple requesters;
an auction server that:
creates an online auction based on the request;
receives multiple bids for the online auction from one or more bidders; and
determines one or more successful bidders out of the one or more bidders based on standardized metrics comprising cost per offer delivered, cost per advertisement delivered or cost per cookie dropped; and
an advertisement server that:
determines that a previous mobile advertisement of a first format is currently displayed on a mobile billing statement via a display of a mobile device of each of the multiple customers;
causes the mobile device of each of the multiple customers to remove the previous mobile advertisement of the first format from the mobile billing statement displayed via the display;
dynamically generates an updated mobile advertisement of a second format based on the one or more successful bidders as determined by the auction server;
transmits the updated mobile advertisement comprising the second format for display on the mobile billing statement via the display of the mobile device of each of the multiple customers on behalf of the one or more successful bidders as determined by the auction server;
receives updated financial information about the multiple customers in response to providing the updated mobile advertisement in real time, wherein the updated financial information includes sales data;
determines analytic information based on distribution and/or outcome metrics based on results of the updated mobile advertisement;
stores the analytic information; and
provides the analytic information to multiple bidders and the auction server in real time, wherein the auction server creates a new online auction with a bidding process based on the stored analytic information.

2. The system according to claim 1, wherein the financial information about the multiple customers of the financial institution is segmented.

3. The system according to claim 2, wherein the financial information about the multiple customers of the financial institution is segmented based on purchase data associated with the multiple customers of the financial institution.

4. The system according to claim 2, wherein the financial information about the multiple customers of the financial institution is segmented based on credit information associated with the multiple customers of the financial institution.

5. The system according to claim 1, wherein the request is to target a segment of the multiple customers of the financial institution based on purchase data associated with the multiple customers of the financial institution.

6. The system according to claim 1, wherein the request is to target a segment of the multiple customers of the financial institution based on credit information associated with the multiple customers of the financial institution.

7. The system of claim 1, wherein the updated financial information comprises at least one of time and date of advertisement presentation, context of advertisement presentation, and purchase data.

8. The system of claim 7, wherein the analytic information comprises at least one of total advertisements presented, a number of purchases by the multiple customers related to the advertisement, a number of existing customer purchases, and a number of new customer purchases.

9. The system of claim 8, wherein the analytic information is based on a predetermined time period after providing the advertisement.

10. The system of claim 2, wherein the financial information about the multiple customers of the financial institution is segmented based on customer travel data.

11. The system of claim 3, wherein the purchase data comprises at least one of: a total spending amount, a type of purchase, and a location of purchase.

12. The system of claim 1, wherein the multiple bids for the online auction from one or more bidders is based on a standardized metric.

13. The system of claim 12, wherein the standardized metric comprises at least one of: cost per delivery, cost per cookie dropped, cost per redemption, cost per repeat customer, and cost per new customer.

14. The system of claim 2, wherein the financial information about the multiple customers of the financial institution is segmented based on customer rewards points.

15. The system of claim 1, wherein determining the one or more successful bidders occurs at a predetermined period of time defined by the request.

16. The system of claim 1, wherein determining the one or more successful bidders occurs at a predetermined bidding price.

17. The system of claim 1, wherein the auction server implements security protocols and safeguards to anonymize and protect private data of the multiple customers of the financial institution.

18. The system of claim 1, wherein the first format comprises a graphical format and the second format comprises a textual format.

19. A method, comprising:
   storing, in a centralized database at a system of a financial institution, pooled financial information about multiple customers of the financial institution, including stock keeping unit (SKU) level data and geocoded data, wherein the centralized database is available for access to both the financial institution and multiple requestors;
   receiving, via a network, a request to access the centralized database to target the multiple customers of the financial institution with an advertisement from requesters via a network based on the pooled financial information, that securely facilitates simultaneous communication and access to the pooled financial information about multiple customers to multiple requestors;
   creating, using an auction server, an online auction based on the request;
   receiving, via a network, multiple bids for the online auction from multiple bidders;
   determining, using the auction server, multiple successful bidders out of the multiple bidders based on standardized metrics comprising cost per offer delivered, cost per advertisement delivered or cost per cookie dropped;
   determining, using an advertisement server, that a previous mobile advertisement of a first format is currently displayed on a webpage via a display of a mobile device of each of the multiple customers;
   causing, using the advertisement server, the mobile device of each of the multiple customers to remove the previous mobile advertisement of the first format from the webpage displayed via the display;
   dynamically generating, using the advertisement server, an updated mobile advertisement of a second format based on the multiple successful bidders;
   transmitting, using the advertisement server, the updated mobile advertisement of the second format for display on the webpage via the display of the mobile device of each of the multiple customers on behalf of the multiple successful bidders;
   receiving, via a network, updated financial information about the multiple customers in response to providing the updated mobile advertisement in real time, wherein the updated financial information includes sales data;
   determining, using the advertisement server, analytic information based on distribution and/or outcome metrics based on results of the updated mobile advertisement;
   storing the analytic information in data storage; and
   providing, using the advertisement server, the analytic information to multiple bidders and the auction server in real time, wherein the auction server creates a new online auction with a bidding process based on the stored analytic information.

20. The method according to claim 19, wherein the financial information about the multiple customers of the financial institution is segmented.

21. The method according to claim 20, wherein the financial information about the multiple customers of the financial institution is segmented based on purchase data associated with the multiple customers of the financial institution.

22. The method according to claim 20, wherein the financial information about the multiple customers of the financial institution is segmented based on credit information associated with the multiple customers of the financial institution.

23. The method according to claim 19, wherein the request is to target a segment of the multiple customers of the financial institution based on purchase data associated with the multiple customers of the financial institution.

24. The method according to claim 19, wherein the request is to target a segment of the multiple customers of the financial institution based on credit information associated with the multiple customers of the financial institution.

25. A non-transitory computer-readable storage medium with an executable program stored thereon, wherein the program instructs a microprocessor to perform the following steps:
   store, in a centralized database at a system of a financial institution, pooled financial information about multiple customers of the financial institution, including stock keeping unit (SKU) level data and geocoded data, wherein the centralized database is available for access to both the financial institution and multiple requestors;
   receive, via a network, a request to access the centralized database to target the multiple customers of the financial institution with an advertisement from a requester via a network based on the pooled financial information that securely facilitates simultaneous communication and access to the pooled financial information about multiple customers to multiple requestors;

create, using an auction server, an online auction based on the request;

receive, via a network, multiple bids for the online auction from multiple bidders;

determine, using the auction server, multiple successful bidders out of the multiple bidders based on standardized metrics comprising cost per offer delivered, cost per advertisement delivered or cost per cookie dropped;

determine, using an advertisement server, that a previous mobile advertisement of a first format is currently displayed on a webpage via a display of a mobile device of each of the multiple customers;

cause, using the advertisement server, the mobile device of each of the multiple customers to remove the previous mobile advertisement of the first format from the webpage displayed via the display;

dynamically generate, using the advertisement server, an updated mobile advertisement of a second format based on the multiple successful bidders;

transmit, using the advertisement server, the updated mobile advertisement of the second format for display on the webpage via the display of the mobile device of each of the multiple customers on behalf of the multiple successful bidders as determined by the auction server;

receive, via a network, updated financial information about the multiple customers in response to providing the updated mobile advertisement in real time, wherein the updated financial information includes sales data;

determine, using the advertisement server, analytic information based on distribution and/or outcome metrics based on results of the updated mobile advertisement;

store the analytic information; and provide the analytic information to multiple bidders and the auction server in real time, wherein the auction server creates a new online auction with a bidding process based on the stored analytic information.

26. The non-transitory computer-readable storage medium according to claim 25, wherein the financial information about the multiple customers of the financial institution is segmented.

27. The non-transitory computer-readable storage medium according to claim 26, wherein the financial information about the multiple customers of the financial institution is segmented based on purchase data associated with the multiple customers of the financial institution.

28. The non-transitory computer-readable storage medium according to claim 26, wherein the financial information about the multiple customers of the financial institution is segmented based on credit information associated with the multiple customers of the financial institution.

29. The non-transitory computer-readable storage medium according to claim 25, wherein the request is to target a segment of the multiple customers of the financial institution based on purchase data associated with the multiple customers of the financial institution.

30. The non-transitory computer-readable storage medium according to claim 25, wherein the request is to target a segment of the multiple customers of the financial institution based on credit information associated with the multiple customers of the financial institution.

* * * * *